(12) United States Patent
Li

(10) Patent No.: US 11,937,224 B2
(45) Date of Patent: Mar. 19, 2024

(54) DATA TRANSMISSION METHOD AND APPARATUS

(71) Applicant: BEIJING XIAOMI MOBILE SOFTWARE CO., LTD., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 428 days.

(21) Appl. No.: 17/413,420

(22) PCT Filed: Dec. 20, 2018

(86) PCT No.: PCT/CN2018/122361
§ 371 (c)(1),
(2) Date: Jun. 11, 2021

(87) PCT Pub. No.: WO2020/124485
PCT Pub. Date: Jun. 25, 2020

(65) Prior Publication Data
US 2022/0061052 A1 Feb. 24, 2022

(51) Int. Cl.
*H04W 72/0453* (2023.01)
*H04L 27/26* (2006.01)

(52) U.S. Cl.
CPC ..... *H04W 72/0453* (2013.01); *H04L 27/2605* (2013.01)

(58) Field of Classification Search
CPC ............. H04L 27/2602; H04L 27/2605; H04L 5/0007; H04L 5/0044; H04L 5/0092; H04W 72/0453
See application file for complete search history.

(56) References Cited

U.S. PATENT DOCUMENTS

2002/0150182 A1* 10/2002 Dogan ................ H04L 27/18
375/343
2010/0142659 A1    6/2010 Gold-Gavriely
(Continued)

FOREIGN PATENT DOCUMENTS

CN         104469926 A    3/2015
CN         105684374 A    6/2016
(Continued)

OTHER PUBLICATIONS

International Search Report in the international application No. PCT/CN2018/122361, dated Sep. 20, 2019.
(Continued)

*Primary Examiner* — Kashif Siddiqui
(74) *Attorney, Agent, or Firm* — Syncoda LLC; Feng Ma

(57) ABSTRACT

A data transmission method includes: when data to be transmitted is subjected to resource mapping on a first symbol of a wireless transmission resource distributed to a sending device, selecting target subcarriers on a frequency domain of the wireless transmission resource at equal intervals according to a pre-acquired sequence number interval; mapping said data to each target subcarrier in the frequency domain; respectively modulating each target subcarrier by using said data to obtain a time domain symbol; setting information of a previous preset length of the time domain symbol to be 0 to obtain an output symbol, wherein the preset length is equal to y/x, y is smaller than x, and x is a serial number interval; and transmitting the output symbol.

20 Claims, 19 Drawing Sheets

(56) References Cited

U.S. PATENT DOCUMENTS

| | | | |
|---|---|---|---|
| 2013/0223332 A1* | 8/2013 | Wu | H04W 72/0446 370/315 |
| 2016/0156494 A1 | 6/2016 | Zhao et al. | |
| 2017/0187557 A1 | 6/2017 | Zhang et al. | |
| 2017/0195155 A1 | 7/2017 | Zhang et al. | |
| 2017/0201405 A1 | 7/2017 | Huang et al. | |
| 2017/0207943 A1 | 7/2017 | Zhang et al. | |
| 2017/0245231 A1 | 8/2017 | Huang et al. | |
| 2018/0302905 A1 | 10/2018 | Fodor et al. | |
| 2019/0068420 A1 | 2/2019 | Zhang et al. | |
| 2019/0068421 A1 | 2/2019 | Zhang et al. | |
| 2019/0124675 A1* | 4/2019 | Gao | H04L 5/0094 |
| 2020/0015257 A1* | 1/2020 | Shao | H04L 1/0072 |
| 2020/0136873 A1 | 4/2020 | Zhang et al. | |
| 2020/0145269 A1 | 5/2020 | Zhang et al. | |
| 2020/0374166 A1 | 11/2020 | Zhang et al. | |
| 2020/0374167 A1 | 11/2020 | Zhang et al. | |
| 2020/0374168 A1 | 11/2020 | Zhang et al. | |
| 2020/0374169 A1 | 11/2020 | Zhang et al. | |
| 2021/0392596 A1 | 12/2021 | Huang et al. | |

FOREIGN PATENT DOCUMENTS

| | | |
|---|---|---|
| CN | 108028821 A | 5/2018 |
| CN | 108933647 A | 12/2018 |
| WO | 2014189424 A1 | 11/2014 |
| WO | 2015042789 A1 | 4/2015 |
| WO | 2015042889 A1 | 4/2015 |
| WO | 2018101863 A1 | 6/2018 |

OTHER PUBLICATIONS

Written Opinion of the International Search Authority in the international application No. PCT/CN2018/122361, dated Sep. 20, 2019.

First Office Action of the Chinese application No. 2018800032456, dated Jul. 1, 2021.

Supplementary European Search Report in the European application No. 18943448.3, dated Jun. 7, 2022.

* cited by examiner

DATA TRANSMISSION METHOD AND APPARATUS

CROSS-REFERENCE TO RELATED APPLICATION

This application is a national stage of International Application No. PCT/CN2018/122361 filed on Dec. 20, 2018, the disclosure of which is hereby incorporated by reference in its entirety.

TECHNICAL FIELD

The present disclosure relates to the field of communication technologies, and more particularly, to a method and device for data transmission.

BACKGROUND

Vehicle to Everything communication (V2X) refers to a new generation of information communication technologies that connect vehicle to everything. V2X includes Vehicle to Vehicle (V2V), Vehicle to Pedestrian (V2P), and Vehicle to Infrastructure (V2I). Cellular based V2X (C-V2X) is a vehicular wireless communication technology formed based on the evolution of cellular network communication technologies such as $3^{th}$ Generation (3G)/$4^{th}$ Generation (4G)/$5^{th}$ Generation (5G), and generally includes two types of communication interfaces. One type of communication interface is a short distance direct communication interface (PC5) between the vehicle, the person, and the road. Another type of communication interface is a cellular communication interface (Uu), which enables reliable communication over long distances and larger range. The communication standard for the PC5 interface of the V2X is based on the Device to Device (D2D), and adopts the broadcast communication mode, that is, the information is broadcast from a single vehicle to a plurality of vehicles.

In the related art, in the LTE V2X communication technology, the fixed subcarrier spacing is 15 KHz, the scheduling is in unit of the subframe, the subframe length is 1 ms, and there are 14 symbols in one subframe. When performing rate matching for the data, the number of bits that can be bore is calculated according to a bearing for 14 symbols. However, when the logical channel is mapped to the physical channel, the Guard Period (GP) is introduced in consideration of the interference to the uplink and downlink data of the base station. That is, there is no data actually transmitted on the last symbol of each subframe, which causes the receiving device to be unable to acquire at least useful information of one symbol, thereby reducing decoding performance, and affecting the service quality and system performance.

SUMMARY

The embodiments of the disclosure provides a method and device for data transmission. The technical solution is as follows.

According to a first aspect of an embodiment of the present disclosure, there is provided a method for data transmission, applied to a transmitting device. The method includes:

when performing resource mapping of data to be transmitted on a first symbol of a wireless transmission resource which is allocated to the transmitting device, selecting, according to a serial number interval acquired in advance, target subcarriers at an equal interval in a frequency domain of the wireless transmission resource;

mapping the data to be transmitted to each of the target subcarriers in a frequency domain;

modulating each of the target subcarriers by using the data to be transmitted to obtain a time domain symbol;

setting information in a forwardmost part of the time domain symbol to 0 to obtain an output symbol, the forwardmost part having a preset length, wherein a preset length is equal to y/x, y is less than x, and x is the serial number interval; and transmitting the output symbol.

In the data transmission method provided in the embodiment of the present disclosure, the data to be transmitted is mapped to the target subcarriers with an equal serial number interval in the frequency domain, the information in a forwardmost part of the time domain symbol corresponding to the first symbol is set to 0, the forwardmost part has a preset length, so that the function of GP is realized. As a result, the data can be normally transmitted on the last symbol of each subframe, thereby avoiding the problem in the related art that the receiving device misses at least the useful information of one symbol due to the data not being transmitted on the last symbol, improving the decoding performance, and improving the service quality and the system performance.

In an embodiment, the method further includes:
  receiving a first control signaling transmitted by a network device, and parsing the first control signaling to acquire the serial number interval and preset length that correspond to the transmitting device; or
  receiving a second control signaling transmitted by a cluster head device in a cluster in which the transmitting device is located, and parsing the second control signaling to acquire the serial number interval and preset length that correspond to the transmitting device; or
  determining, according to a processing capability of the transmitting device, the serial number interval and preset length that correspond to the transmitting device.

In an embodiment, the method further includes:
  transmitting a third control signaling to a receiving device, wherein the third control signaling comprises the serial number interval and preset length that correspond to the transmitting device.

In an embodiment, the serial number interval includes 2, 4 or 6.

According to a second aspect of an embodiment of the present disclosure, there is provided a method for data transmission, applied to a receiving device. The method includes:

acquiring a serial number interval and preset length that correspond to a transmitting device, wherein the preset length is equal to y/x, y is less than x, and x is the serial number interval;

in response to that an output symbol transmitted by the transmitting device is received, determining data to be transmitted according to the serial number interval and information of the output symbol other than information in a forwardmost part of the output symbol, the forwardmost part having the preset length.

In an embodiment, the operation that acquiring the preset length which corresponds to the transmitting device includes:
  receiving a third control signaling transmitted by the transmitting device, and parsing the third control signaling to acquire the serial number interval and preset length that correspond to the transmitting device; or receiving a fourth control signaling transmitted by a network device, and parsing the fourth control signaling to acquire the serial number interval and preset length that correspond to the transmitting device; or receiving a fifth control signaling transmitted by a cluster head device in a cluster in which the transmitting device is located, and parsing the fifth control signaling to acquire the serial number interval and preset length that correspond to the transmitting device.

In an embodiment, the serial number interval includes 2, 4 or 6.

According to a third aspect of an embodiment of the present disclosure, there is provided a device for data transmission. The device includes:

a selection module, configured to, when performing resource mapping of data to be transmitted on a first symbol of a wireless transmission resource which is allocated to the transmitting device, select, according to a serial number interval acquired in advance, target subcarriers at an equal interval in a frequency domain of the wireless transmission resource;

a mapping module, configured to map the data to be transmitted to each of the target subcarriers in a frequency domain;

a modulation module, configured to modulate each of the target subcarriers by using the data to be transmitted to obtain a time domain symbol;

a processing module, configured to set information in a forwardmost part of the time domain symbol to 0 to obtain an output symbol, the forwardmost part having a preset length, wherein the preset length is equal to $y/x$, y is less than x, and x is the serial number interval; and a transmitting module, configured to transmit the output symbol.

In an embodiment, the device further includes:

a first receiving module, configured to receive a first control signaling transmitted by a network device, and parse the first control signaling to acquire the serial number interval and preset length that correspond to the transmitting device; or a second receiving module, configured to receive a second control signaling transmitted by a cluster head device in a cluster in which the transmitting device is located, and parse the second control signaling to acquire the serial number interval and preset length that correspond to the transmitting device; or a first determining module, configured to determine, according to a processing capability of the transmitting device, the serial number interval and preset length that correspond to the transmitting device.

In an embodiment, the device further includes:

a sending module, configured to transmit a third control signaling to a receiving device, wherein the third control signaling comprises the serial number interval and preset length that correspond to the transmitting device.

In an embodiment, the serial number interval includes 2, 4 or 6.

According to a fourth aspect of an embodiment of the present disclosure, there is provided a device for data transmission. The device includes:

an acquiring module, configured to acquire a serial number interval and preset length that correspond to a transmitting device, wherein the preset length is equal to $y/x$, y is less than the x, and x is the serial number interval;

a second determining module, configured to, in response to that an output symbol transmitted by the transmitting device is received, determine data to be transmitted according to the serial number interval and information of the output symbol other than information in a forwardmost part of the output symbol, the forwardmost part having the preset length.

In an embodiment, the acquiring module receives a third control signaling transmitted by the transmitting device, and parses the third control signaling to acquire the serial number interval and preset length corresponding to the transmitting device; or the acquiring module receives a fourth control signaling transmitted by a network device, and parses the fourth control signaling to acquire the serial number interval and preset length corresponding to the transmitting device; or the acquiring module receives a fifth control signaling transmitted by a cluster head device in a cluster in which the transmitting device is located, and parses the fifth control signaling to acquire the serial number interval and preset length corresponding to the transmitting device.

In an embodiment, the serial number interval includes 2, 4 or 6.

According to a fifth aspect of an embodiment of the present disclosure, there is provided a device for data transmission. The device includes:

a processor;

memory for storing instructions executable by the processor.

Herein the processor is configured to:

when performing resource mapping of data to be transmitted on a first symbol of a wireless transmission resource which is allocated to the transmitting device, select, according to a serial number interval acquired in advance, target subcarriers at an equal interval in a frequency domain of the wireless transmission resource;

map the data to be transmitted to each of the target subcarriers in a frequency domain;

modulate each of the target subcarriers by using the data to be transmitted to obtain a time domain symbol;

set information in a forwardmost part of the time domain symbol to 0 to obtain an output symbol, the forwardmost part having a preset length, wherein a preset length is equal to $y/x$, y is smaller than x, and x is the serial number interval; and transmit the output symbol.

According to a sixth aspect of an embodiment of the present disclosure, there is provided a device for data transmission. The device includes:

a processor;

memory for storing instructions executable by the processor.

Herein the processor is configured to:

acquire a serial number interval and preset length that correspond to a transmitting device, wherein the preset length is equal to $y/x$, y is less than x, and x is the serial number interval;

in response to that an output symbol transmitted by the transmitting device is received, determine data to be transmitted according to the serial number interval and information of the output symbol other than information in a forwardmost part of the output symbol, the forwardmost part having the preset length.

According to a seventh aspect of an embodiment of the present disclosure, there is provided a computer readable storage medium having stored thereon computer instructions that, when executed by a processor, cause the processor to implement steps of the method described in the first aspect.

According to an eighth aspect of an embodiment of the present disclosure, there is provided a computer readable storage medium having stored thereon computer instructions that, when executed by a processor, cause the processor to implement steps of the method described in the second aspect.

It is to be understood that the foregoing general description and the following detailed description are exemplary and explanatory only, and are not intended to limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
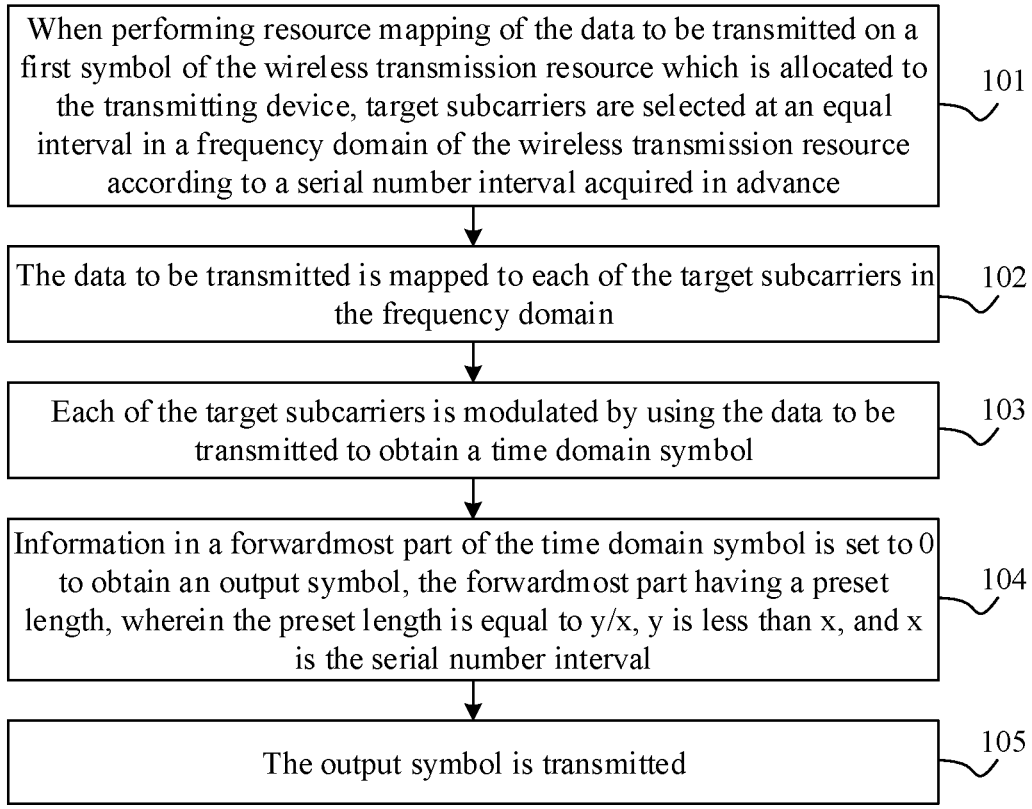
FIG. 1 is a flowchart of a data transmission method according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects of the disclosure as recited in the appended claims.

An embodiment of the present disclosure provides a method for data transmission, which is applied to a transmitting device. The method includes: when the performing resource mapping of data to be transmitted on a first symbol of a wireless transmission resource which is allocated to the transmitting device, selecting, according to a serial number interval acquired in advance, target subcarriers at an equal interval in a frequency domain of the wireless transmission resource; mapping data to be transmitted to each of the target subcarriers in a frequency domain; modulating each of the target subcarriers by using the data to be transmitted to obtain a time domain symbol; setting information in a forwardmost part of the time domain symbol to 0 to obtain an output symbol, the forwardmost part having a preset length, wherein the preset length is equal to y/x, y is less than x, and x is the serial number interval; and transmitting the output symbol. In the data transmission method provided in the embodiment of the present disclosure, the data to be transmitted is mapped to the target subcarriers with an equal serial number interval in the frequency domain, the information in a forwardmost part of the time domain symbol corresponding to the first symbol is set to 0, the forwardmost part has a preset length, so that the function of GP is realized. As a result, the data can be normally transmitted on the last symbol of each subframe, thereby avoiding the problem in the related art that the receiving device misses at least the useful information of one symbol due to the data not being transmitted on the last symbol, improving the decoding performance, and improving the service quality and the system performance.

It is to be noted that the method for data transmission provided in the embodiment of the present disclosure can be applied to a 4G/5G-based C-V2X communication network. The transmitting device and the receiving device involved in the present disclosure may include, for example, a vehicle-mounted device, a roadside device, or a user handheld device. The user handheld device may include, for example, an electronic device such as a smartphone, a laptop, or an intelligent wearable device. The network device involved in the present disclosure may include, for example, a base station, a relay station and other communication devices that provide the wireless access service for a terminal.

Based on the above analysis, the following specific embodiments are proposed.

FIG. 1 is a flowchart of a data transmission method according to an exemplary embodiment. The execution subject of the data transmission method may be a transmitting device. As illustrated in FIG. 1, the method includes the operations at blocks 101-105.

At block 101, when the performing resource mapping of data to be transmitted on the first symbol of the wireless transmission resource which is allocated to the transmitting device, the target subcarriers are selected at an equal interval in the frequency domain of the wireless transmission resource according to the serial number interval acquired in advance.

For example, the data to be transmitted may include user data or a pilot signal. The serial number interval may include 2, 4 or 6. The implementation of acquiring the serial number interval and preset length corresponding to the transmitting device may include any one or a combination of the following manners.

In the first manner, the network device determines the serial number interval and preset length corresponding to the transmitting device according to the coverage radius and the processing capability of the transmitting device. The network device transmits a first control signaling to the transmitting device, and the first control signaling includes the serial number interval and preset length that correspond to the transmitting device. The transmitting device receives the first control signaling transmitted by the network device, and parses the first control signaling to acquire the serial number interval and preset length corresponding to the transmitting device.

In the second manner, after determining the serial number interval and preset length corresponding to the transmitting device according to the transmission distance and the processing capability of the terminal in the cluster, the cluster head device in the cluster, in which the transmitting device is located, transmits a second control signaling to the transmitting device. The second control signaling includes the serial number interval and preset length that correspond to the transmitting device. The transmitting device receives the second control signaling transmitted by the cluster head device in the cluster in which the transmitting device is located, and parses the second control signaling to acquire the serial number interval and preset length corresponding to the transmitting device.

In the third manner, the transmitting device determines the serial number interval and preset length corresponding to the transmitting device according to the processing capability of the transmitting device. Optionally, after acquiring the serial number interval and preset length corresponding to the transmitting device, the transmitting device may transmit the third control signaling to the receiving device. Herein the third control signaling includes the serial number interval and preset length corresponding to the transmitting device.

At block 102, the data to be transmitted is mapped to each of the target subcarriers in the frequency domain.

At block 103, each of the target subcarriers is modulated by using the data to be transmitted to obtain a time domain symbol.

At block 104, information in a forwardmost part of the time domain symbol is set to 0 to obtain an output symbol, the forwardmost part having a preset length. Herein, the preset length is equal to y/x, y is less than x, and x is the serial number interval.

At block 105, the output symbol is transmitted.

For example, the receiving device acquires the serial number interval and preset length corresponding to the transmitting device in advance. When the output symbol transmitted by the transmitting device is received, the receiving device does not process and make statistics of the information in a forwardmost part, which has a preset length, of the output symbol, but demodulates and processes information of the output symbol other than information in a forwardmost part, which has the preset length, of the output symbol according to the serial number interval, and then obtains the data to be transmitted.

According to the technical solution provided in the embodiment of the present disclosure, the data to be transmitted is mapped to the target subcarriers with the equal serial number interval in the frequency domain, and the information in a forwardmost part of the time domain symbol corresponding to the first symbol is set to 0, the forwardmost part has a preset length, so that the function of the GP is realized. As a result, the data can be normally transmitted on the last symbol of each subframe, thereby avoiding the problem in the related art that the receiving device misses at least the useful information of one symbol due to the data not being transmitted on the last symbol, improving the decoding performance, and improving the service quality and the system performance.

Figure 2:
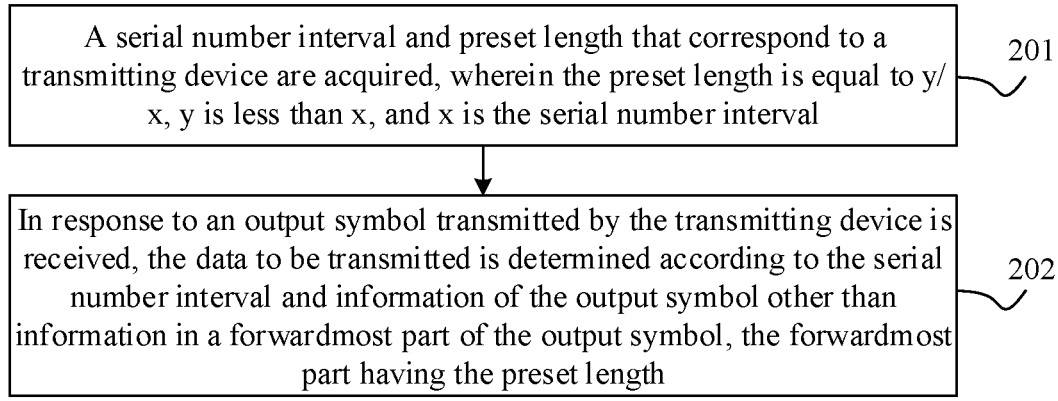
FIG. 2 is a flowchart of a data transmission method according to an exemplary embodiment.

FIG. 2 is a flowchart of a data transmission method according to an exemplary embodiment. The execution subject of the data transmission method may be a receiving device. As illustrated in FIG. 2, the method includes the operations at blocks 201-202.

At block 201, a serial number interval and preset length corresponding to the transmitting device are acquired. Herein, the preset length is equal to y/x, y is less than x, and x is the serial number interval.

For example, the serial number interval includes 2, 4 or 6. For example, when the serial number interval is 2, the preset length is equal to ½. When the serial number interval is 4, the preset length is equal to ¼. When the serial number interval is 6, the preset length is equal to ⅙.

For example, the implementation of acquiring the serial number interval and preset length corresponding to the transmitting device may include any one or a combination of the following manners.

In the manner a, the receiving device receives the third control signaling transmitted by the transmitting device, and parses the third control signaling to cquire the serial number interval and preset length that correspond to the transmitting device.

In the manner b, the receiving device receives the fourth control signaling transmitted by the network device, and parses the fourth control signaling to acquire the serial number interval and preset length that correspond to the transmitting device.

In the manner c, the receiving device receives the fifth control signaling transmitted by the cluster head device in the cluster in which the receiving device is located, and parses the fifth control signaling to acquire the serial number interval and preset length that correspond to the transmitting device.

At block 202, in response to that the output symbol transmitted by the transmitting device is received, the data to be transmitted is determined according to the serial number interval and information of the output symbol other than information in a forwardmost part of the output symbol, the forwardmost part having the preset length.

For example, the first symbol of the output symbol may be the first symbol transmitted by the transmitting device or may be the first symbol of a time slot.

According to the technical solution provided in the embodiment of the present disclosure, the serial number interval and preset length corresponding to the transmitting device are acquired in advance, when the output symbol of the transmitting device is received, the receiving device does not process and make statistics of the information in a forwardmost part, which has a preset length, of the output symbol, but demodulates and processes information of the output symbol other than information in a forwardmost part, which has the preset length, of the output symbol according to the serial number interval, and then obtains the data to be transmitted. Since the last symbol of each subframe carries information, the problem in the related art that the receiving device misses at least the useful information of one symbol due to the data not being transmitted on the last symbol is avoided, the decoding performance is improved, and the service quality and system performance can be improved.

Figure 3:
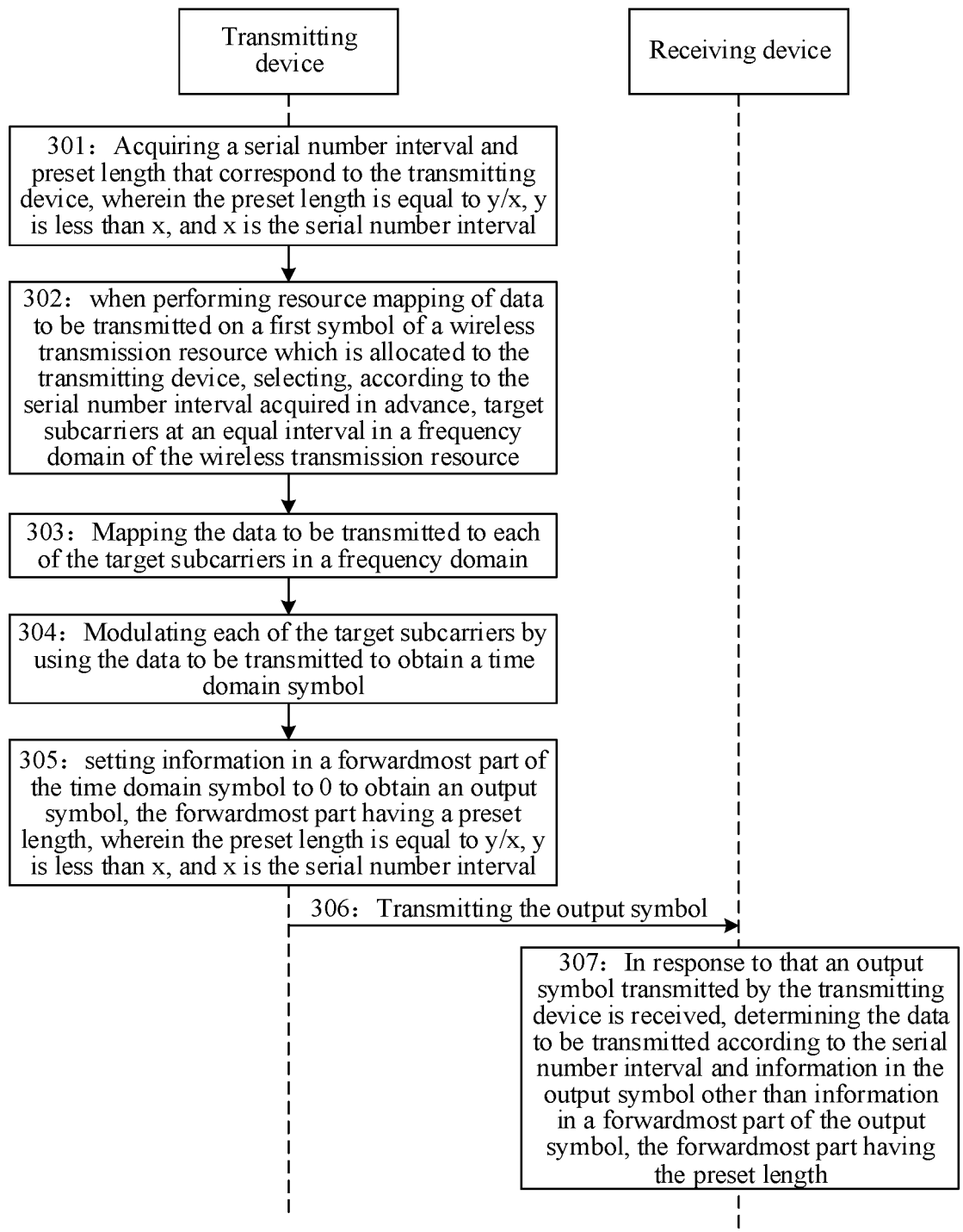
FIG. 3 is a flowchart of a data transmission method according to an exemplary embodiment.

FIG. 3 is a flowchart of a data transmission method according to an exemplary embodiment. The method is implemented by a transmitting device in cooperation with a receiving device in a 4G/5G-based C-V2X communication network. As illustrated in FIG. 3, based on the embodiments illustrated in FIG. 1 and FIG. 2, the data transmission method according to the present disclosure may include the steps 301-307.

In Step 301, the transmitting device acquires a serial number interval and preset length that correspond to the transmitting device. Herein, the preset length is equal to y/x, y is less than x, and x is the serial number interval.

In Step 302, when the transmitting device performs resource mapping of the data to be transmitted on a first symbol of the wireless transmission resource which is allocated to the transmitting device, the transmitting device selects, according to the serial number interval acquired in advance, the target subcarriers at the equal interval in a frequency domain of the wireless transmission resource.

Figure 4:
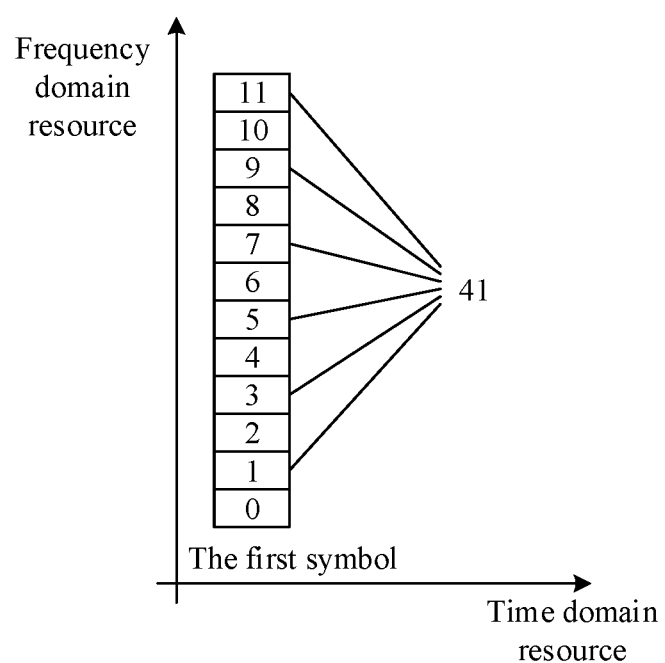
FIG. 4 is a schematic diagram of a frequency domain resource mapping on a first symbol according to an exemplary embodiment.
Figure 5:
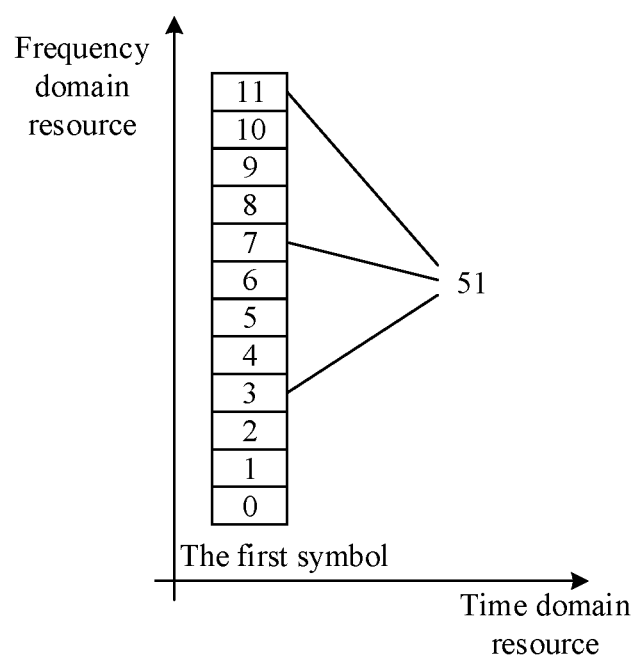
FIG. 5 is a schematic diagram of a frequency domain resource mapping on a first symbol according to an exemplary embodiment.
Figure 6:
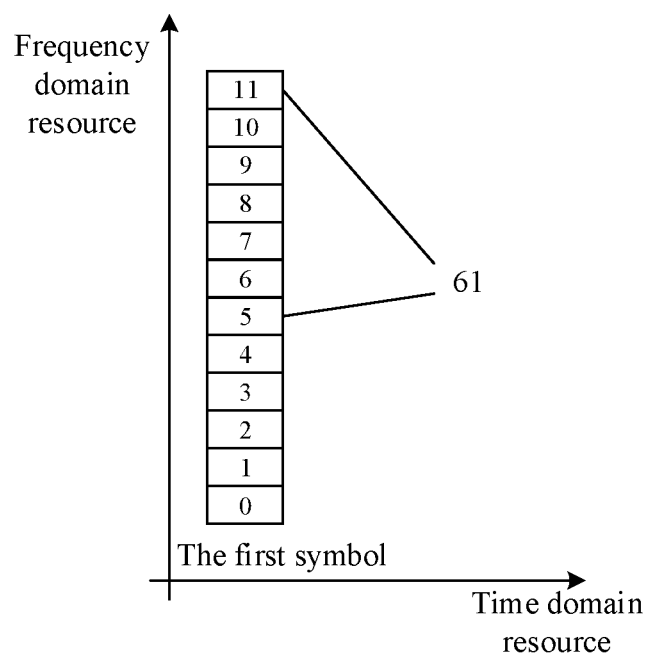
FIG. 6 is a schematic diagram of a frequency domain resource mapping on a first symbol according to an exemplary embodiment.

For example, FIG. 4 to FIG. 6 are schematic diagrams illustrating frequency domain resources mapping on a first symbol according to an exemplary embodiment. FIG. 4 to FIG. 6 illustrate three different frequency domain resource mapping manners, respectively. Referring to FIG. 4, the first symbol refers to the first symbol of the wireless transmission resource which is allocated to the transmitting device. The target subcarriers are selected at the equal interval in the frequency domain of the wireless transmission resource. The serial numbers of the selected target subcarriers are 1, 3, 5, 7, 9 and 11, respectively. The serial number interval of the target subcarriers is 2. Of course, the subcarriers with serial number 0, 2, 4, 6, 8 and 10 may be selected as the target subcarriers. Referring to FIG. 5, the serial number interval of the target subcarriers is 4, and the serial numbers of the selected target subcarriers are 3, 7 and 11, respectively. Referring to FIG. 6, the serial number interval of the target subcarriers is 6, and the serial numbers of the selected target subcarriers are 5 and 11, respectively.

In Step 303, the transmitting device maps the data to be transmitted to each of the target subcarriers in a frequency domain.

In Step 304, the transmitting device modulates each of the target subcarriers by using the data to be transmitted to obtain a time domain symbol.

In Step 305, the transmitting device setting information in a forwardmost part of the time domain symbol to 0 to obtain an output symbol, the forwardmost part having a preset length. Herein, the preset length is equal to y/x, y is less than x, and x is the serial number interval.

Figure 7:
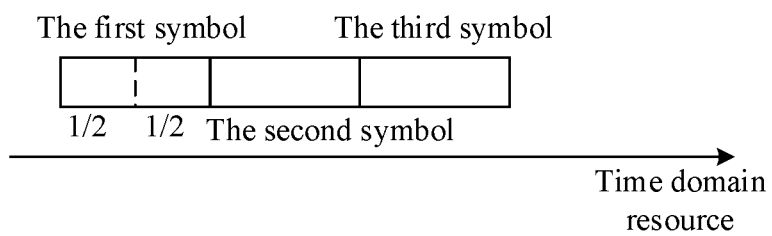
FIG. 7 is a schematic diagram of time domain symbols according to an exemplary embodiment.
Figure 8:
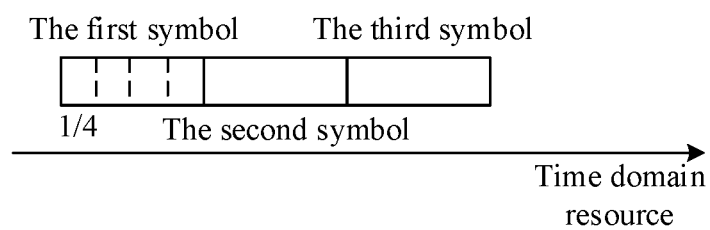
FIG. 8 is a schematic diagram of time domain symbols according to an exemplary embodiment.
Figure 9:
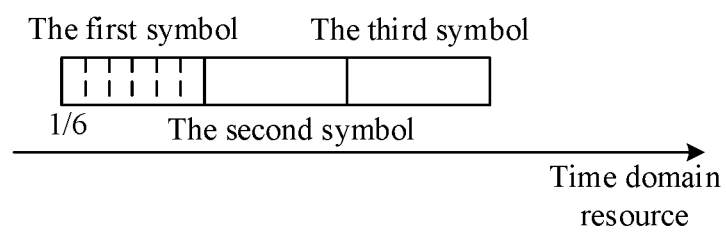
FIG. 9 is a schematic diagram of time domain symbols according to an exemplary embodiment.

For example, FIG. 7 to FIG. 9 are schematic diagrams illustrating the time domain symbols according to an exemplary embodiment. FIG. 7 to FIG. 9 correspond to three different frequency domain resource mapping manners illustrated in FIG. 4 to FIG. 6, respectively.

Referring to FIG. 4 and FIG. 7, the serial number interval x is 2, y is 1, and the preset length is equal to ½. After the conversion to the time domain, information of the first ½ length of the first time domain symbol is set to 0, and the operation of setting to 0 is not performed on other time domain symbols. The receiving device can recover to obtain the data to be transmitted according to the information of the last ½ length of the first time domain symbol.

Referring to FIG. 5 and FIG. 8, the number interval x is 4, and y may be 1, 2 or 3. Taking y being 1 as an example, the preset length is equal to ¼. After the conversion to the time domain, information of the first ¼ length of the first time domain symbol is set to 0, and the operation of setting to 0 is not performed on other time domain symbols. Optionally, the second ¼ length of the first time domain symbol may be used for Automatic Gain Control (AGC) processing, and the receiving device can recover to obtain the data to be transmitted according to the information of the last ½ length of the first time domain symbol. Taking y being 2 as an example, the preset length is equal to ½. After the conversion to the time domain, information of the first ½ length of the first time domain symbol is set to 0, and the operation of setting to 0 is not performed on other time domain symbols. Optionally, the third ¼ length of the first time domain symbol may be used for AGC processing, and the receiving device may recover to obtain the data to be transmitted according to the information of the fourth ¼ length of the first time domain symbol.

Referring to FIG. 6 and FIG. 9, the serial number interval x is 6, and y may be 1, 2, 3, 4, or 5. Taking y being 1 as an example, the preset length is equal to ⅙. After the conversion to the time domain, information of the first ⅙ length of the first time domain symbol is set to 0, and the operation of setting to 0 is not performed on other time domain symbols.

In Step 306, the transmitting device transmits the output symbol.

In Step 307, in response to that an output symbol transmitted by the transmitting device is received, the receiving device determines the data to be transmitted according to the serial number interval and information of the output symbol other than information in a forwardmost part of the output symbol, the forwardmost part having the preset length.

For example, the receiving device acquires the serial number interval and preset length corresponding to the transmitting device in advance. Herein, the preset length is equal to y/x, y is less than x, and x is a serial number interval. When the output symbol transmitted by the transmitting device is received, the receiving device does not process and make statistics of the information in a forwardmost part, which has a preset length, of the output symbol, but demodulates and processes information of the output symbol other than information in a forwardmost part, which has the preset length, of the output symbol according to the serial number interval, and then obtains the data to be transmitted.

According to the technical solution provided in the embodiments of the present disclosure, the data to be transmitted is mapped to the target subcarriers with an equal serial number interval in the frequency domain, the information in a forwardmost part of the time domain symbol corresponding to the first symbol is set to 0, and the forwardmost part has a preset length, so that the function of GP is realized. As a result, the data can be normally transmitted on the last symbol of each subframe, thereby avoiding the problem in the related art that the receiving device misses at least the useful information of one symbol due to the data not being transmitted on the last symbol, improving the decoding performance, and improving the service quality and the system performance.

In an embodiment, the procedure of physical layer processing in the mobile communication system may include the steps 1-9.

In Step 1, the Cyclic Redundancy Check (CRC) is added to each transmission block. In order to ensure the error detection of the channel, a CRC check code needs to be added to the data block transmitted from the MAC layer.

In Step 2, the code block segmentation is performed, and the CRC check information is added to the code block. To ensure that the code block is not greater than X (e.g., 6144)

bits, the transmission block needs to be segmented. In order that the receiving device can terminate the error decoding in advance, the CRC check information is added to each code block.

In Step 3, it is channel encoding. A sequence with k bits is mapped to a sequence with m bits. Herein the bits before encoding are referred to as original bits or source bits, and the bits after encoding are referred to as codewords or codeword bits. Generally, m is greater than or equal to k, and k/m is referred to as a code rate of encoding.

In Step 4, it is the rate matching. It is determined whether the physical resource actually transmitted matches the bits after encoding. When the physical resource actually transmitted is greater than the number of bits after encoding, the bits after encoding needs to be repeated according to a certain rule. When the physical resources actually transmitted are less than the number of bits after encoding, a part of the bits after encoding should be knocked off to achieve the matching of the transmission capability and the transmission data. The rate matching process is exemplified as follows: assuming that the physical bearer allocated to the transmitting device (user) is two Resource Blocks (RBs), each RB has 12 subcarriers and 14 symbols, the modulation mode is Quadrature Phase Shift Keying (QPSK) modulation, and using the single-port antenna for transmitting, then the currently available physical bearer is 2*12*14*2=672, and the bits of the data to be transmitted after encoding are 70 bits. It is necessary to repeat the 70 bits according to a certain rule to reach 672 bits.

In Step 5, it is the code block concatenation.

In Step 6, it is channel interleaving. In order to avoid the influence of the channel selective fading on the information, interleaving processing is performed on the transmission data.

In Step 7, the logical channel is mapped to the physical channel. When the data to be transmitted is resource mapped on the first symbol of the wireless transmission resource allocated to the transmitting device, the target subcarriers are selected at the equal interval in the frequency domain of the wireless transmission resource according to the serial number interval acquired in advance. The data to be transmitted is mapped to each of the target subcarriers in a frequency domain. The available transmission resources refer to the actual physical transmission resources of the time domain, the frequency domain, the spatial domain, and the code domain that are allocated to the transmitting device.

In Step 8, it is the Orthogonal Frequency Division Multiplexing (OFDM) modulation and the addition of Cyclic Prefix (CP). Each of the target subcarriers is modulated by using the data to be transmitted to obtain a time domain symbol. The information in a forwardmost part of the time domain symbol is set to 0 to obtain an output symbol, and the forwardmost part has a preset length. Herein, the preset length is equal to y/x, y is less than x, and x is the serial number interval.

In Step 9, it is parallel-serial change. The parallel-serial conversion is completed and the output symbol is transmitted in order of time.

The receiving device learns in advance the serial number interval and preset length of the first symbol of the output symbol of the transmitting device. When the output symbol of the transmitting device is received, the receiving device does not make statistics on the information of the first y/x length of the first symbol of the output symbol, but only performs analog signal reception and/or AGC operation and processing on information of the output symbol other than information of the first y/x length of the output symbol, and performs analog signal reception on other subsequently received symbols, thereby realizing the function of the GP. Since the last symbol of each subframe carries information, the problem in the related art that the receiving device misses at least the useful information of one symbol due to the data not being transmitted on the last symbol is avoided, and the decoding performance and system performance are improved.

The following are embodiments of the device of the present disclosure, which can be used to execute the embodiments of the method of the present disclosure.

Figure 10:
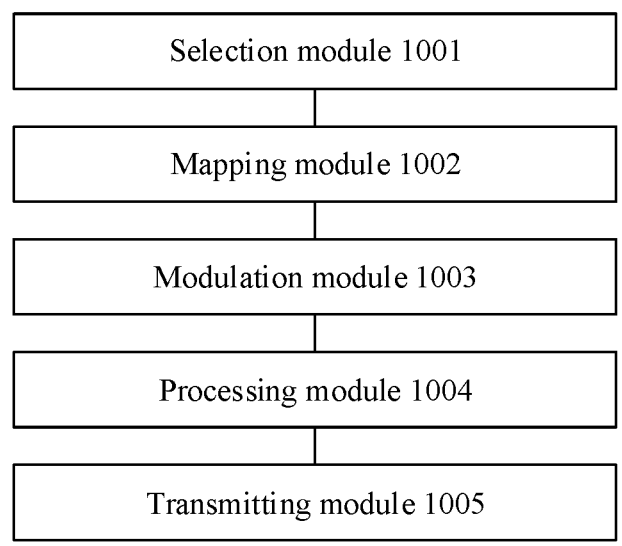
FIG. 10 is a block diagram of a data transmission device according to an exemplary embodiment.

FIG. 10 is a block diagram illustrating a data transmission device according to an exemplary embodiment. The data transmission device may be applied to a transmitting device. Referring to FIG. 10, the data transmission device includes a selection module 1001, a mapping module 1002, a modulation module 1003, a processing module 1004, and a transmitting module 1005.

The selection module 1001 is configured to, when performing resource mapping of data to be transmitted on a first symbol of a wireless transmission resource which is allocated to the transmitting device, select, according to a serial number interval acquired in advance, target subcarriers at an equal interval in a frequency domain of the wireless transmission resource;

The mapping module 1002 is configured to map the data to be transmitted to each of the target subcarriers in a frequency domain;

The modulation module 1003 is configured to modulate each of the target subcarriers by using the data to be transmitted to obtain a time domain symbol;

The processing module 1004 is configured to set information in a forwardmost part of the time domain symbol to 0 to obtain an output symbol, the forwardmost part having a preset length, wherein the preset length is equal to y/x, y is less than x, and x is the serial number interval;

The transmitting module 1005 is configured to transmit the output symbols.

According to the device provided in the embodiment of the present disclosure, the data to be transmitted is mapped to the target subcarriers with an equal serial number interval in the frequency domain, the information in a forwardmost part of the time domain symbol corresponding to the first symbol is set to 0, and the forwardmost part has a preset length, so that the function of GP is realized. As a result, the data can be normally transmitted on the last symbol of each subframe, thereby avoiding the problem in the related art that the receiving device misses at least the useful information of one symbol due to the data not being transmitted on the last symbol, improving the decoding performance, and improving the service quality and the system performance.

Figure 11A:
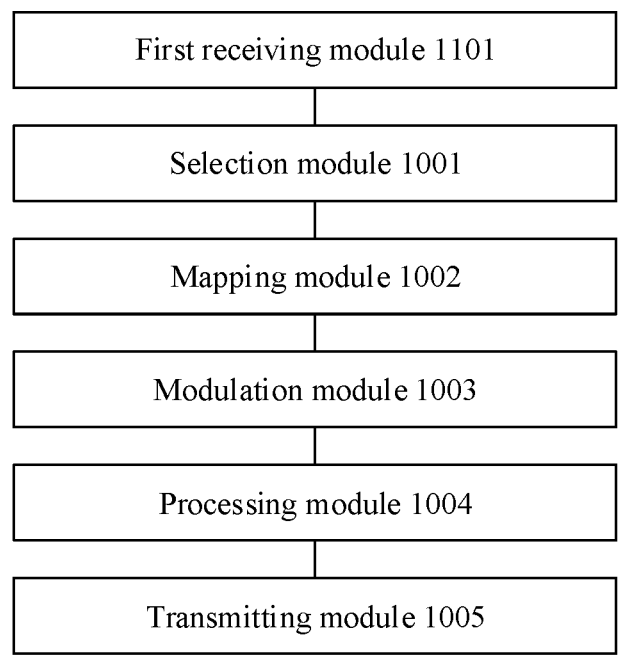
FIG. 11a is a block diagram of a data transmission device according to an exemplary embodiment.

In an embodiment, as illustrated in FIG. 11A, the data transmission device illustrated in FIG. 10 may further include a first receiving module 1101, which is configured to receive a first control signaling transmitted by a network device, and parse the first control signaling to acquire the serial number interval and preset length that correspond to the transmitting device.

Figure 11B:
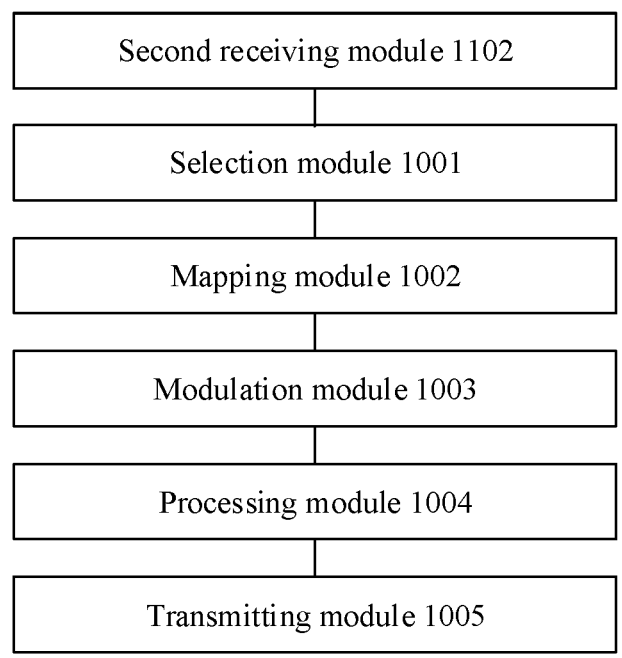
FIG. 11b is a block diagram of a data transmission device according to an exemplary embodiment.

In an embodiment, as illustrated in FIG. 11B, the data transmission device illustrated in FIG. 10 may further include a second receiving module 1102, which is configured to receive a second control signaling transmitted by a cluster head device in a cluster in which the transmitting device is located, and parse the second control signaling to acquire the serial number interval and preset length that correspond to the transmitting device.

Figure 11C:
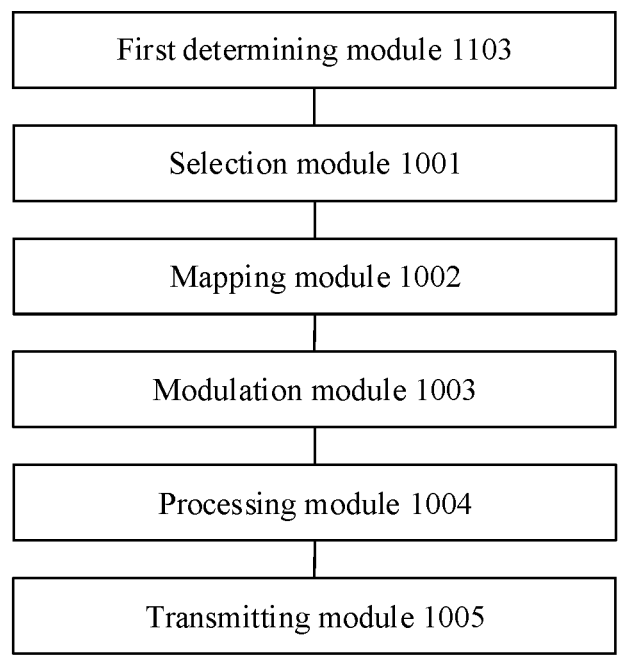
FIG. 11c is a block diagram of a data transmission device according to an exemplary embodiment.

In an embodiment, as illustrated in FIG. 11C, the data transmission device illustrated in FIG. 10 may further include a first determining module 1103, which is configured to determine, according to a processing capability of the transmitting device, the serial number interval and preset length that correspond to the transmitting device.

Figure 12:
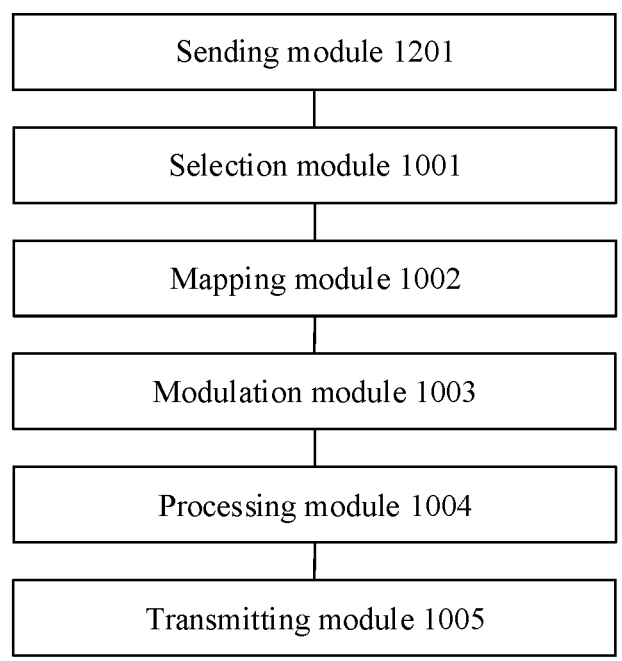
FIG. 12 is a block diagram of a data transmission device according to an exemplary embodiment.

In an embodiment, as illustrated in FIG. 12, the data transmission device illustrated in FIG. 10 may further include a sending module 1201, which is configured to transmit a third control signaling to the receiving device. Herein the third control signaling includes the serial number interval and preset length that correspond to the transmitting device.

In an embodiment, the serial number interval includes 2, 4, or 6.

Figure 13:
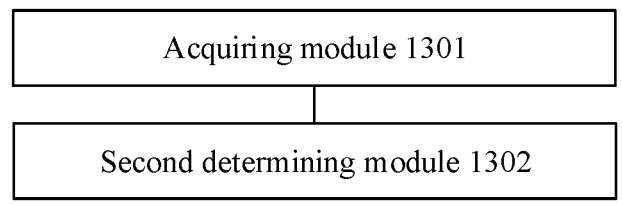
FIG. 13 is a block diagram of a data transmission device according to an exemplary embodiment.

FIG. 13 is a block diagram illustrating a data transmission device according to an exemplary embodiment. The data transmission device may be applied to a receiving device. Referring to FIG. 13, the data transmission device includes an acquiring module 1301 and a second determining module 1302.

The acquiring module 1301 is configured to acquire a serial number interval and preset length that correspond to the transmitting device. Herein the preset length is equal to y/x, y is less than x, and x is a serial number interval;

The second determining module 1302 is configured to, in response to that an output symbol transmitted by the transmitting device is received, determine the data to be transmitted according to the serial number interval and information of the output symbol other than information in a forwardmost part of the output symbol, the forwardmost part having the preset length.

In an embodiment, the acquiring module 1301 receives the third control signaling transmitted by the transmitting device, and parses the third control signaling to acquire the serial number interval and preset length that correspond to the transmitting device; or the acquiring module receives a fourth control signaling transmitted by a network device, and parses the fourth control signaling to acquire the serial number interval and preset length that correspond to the transmitting device; or the acquiring module receives a fifth control signaling transmitted by a cluster head device in a cluster in which the transmitting device is located, and parses the fifth control signaling to acquire the serial number interval and preset length that correspond to the transmitting device.

In an embodiment, the serial number interval includes 2, 4, or 6.

Figure 14:
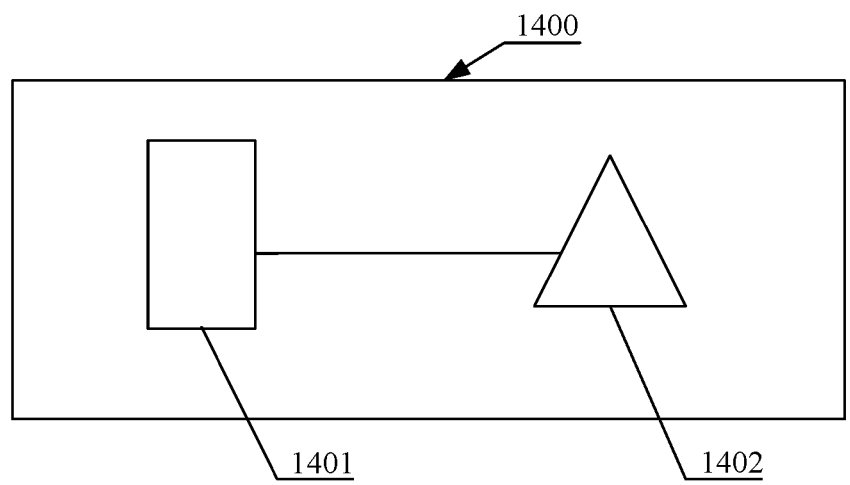
FIG. 14 is a block diagram of a data transmission device according to an exemplary embodiment.

FIG. 14 is a block diagram illustrating a data transmission device 1400 according to an exemplary embodiment. The data transmission device is applied to a transmitting device. The data transmission device 1400 includes:
a processor 1401;
memory 1402 for storing instructions executable by the processor.

Herein the processor 1401 is configured to:
when performing resource mapping of data to be transmitted on a first symbol of a wireless transmission resource which is allocated to the transmitting device, select, according to a serial number interval acquired in advance, target subcarriers at an equal interval in a frequency domain of the wireless transmission resource;
map the data to be transmitted to each of the target subcarriers in a frequency domain;
modulate each of the target subcarriers by using the data to be transmitted to obtain a time domain symbol;
set information in a forwardmost part of the time domain symbol to 0 to obtain an output symbol, the forwardmost part having a preset length, wherein the preset length is equal to y/x, y is smaller than x, and x is the serial number interval; and;
transmit the output symbols.

In an embodiment, the processor 1401 may further be configured to:
receive a first control signaling transmitted by a network device, and parse the first control signaling to acquire the serial number interval and preset length that correspond to the transmitting device; or
receive a second control signaling transmitted by a cluster head device in a cluster in which the transmitting device is located, and parse the second control signaling to acquire the serial number interval and preset length that correspond to the transmitting device; or
determine, according to a processing capability of the transmitting device, the serial number interval and preset length that correspond to the transmitting device.

In an embodiment, the processor 1401 may further be configured to:
transmit a third control signaling to a receiving device. Herein the third control signaling comprises the serial number interval and preset length that correspond to the transmitting device.

In an embodiment, the serial number interval includes 2, 4, or 6.

Figure 15:
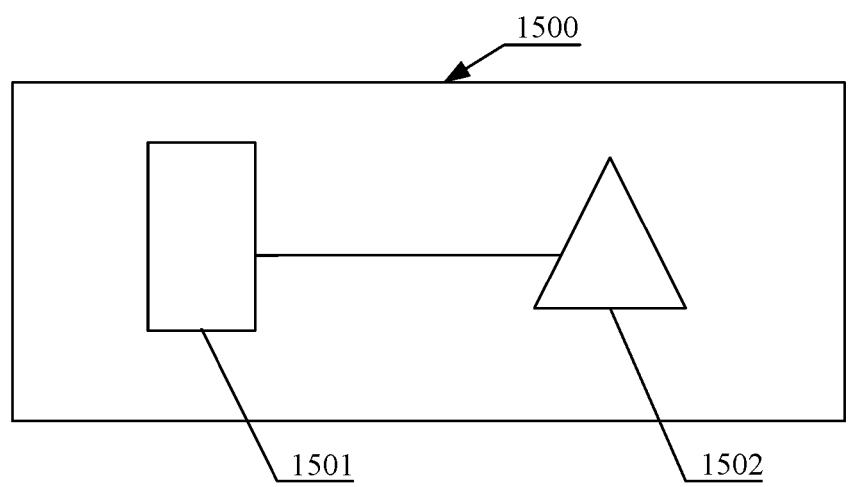
FIG. 15 is a block diagram of a data transmission device according to an exemplary embodiment.

FIG. 15 is a block diagram of a data transmission device 1500 according to an exemplary embodiment. The data transmission device is applied to a receiving device. The data transmission device 1500 includes:
a processor 1501;
memory 1502 for storing instructions executable by the processor.

Herein the processor 1501 is configured to:
acquire a serial number interval and preset length that correspond to a transmitting device. Herein the preset length is equal to y/x, y is less than the x, and x is the serial number interval;
in response to that an output symbol transmitted by the transmitting device is received, determine data to be transmitted according to the serial number interval and information of the output symbol other than information in a forwardmost part of the output symbol, the forwardmost part having the preset length.

In an embodiment, the processor 1501 may further be configured to:
receive a third control signaling transmitted by the transmitting device, and parse the third control signaling to acquire the serial number interval and preset length that correspond to the transmitting device; or
receive a fourth control signaling transmitted by a network device, and parse the fourth control signaling to acquire the serial number interval and preset length that correspond to the transmitting device; or
receive a fifth control signaling transmitted by a cluster head device in a cluster in which the transmitting device is located, and parse the fifth control signaling to acquire the serial number interval and preset length that correspond to the transmitting device.

In an embodiment, the serial number interval includes 2, 4, or 6.

With respect to the devices in the above embodiments, the specific manner for performing operations for individual modules therein have been described in detail in the embodiments regarding the method, which will not be elaborated herein.

Figure 16:
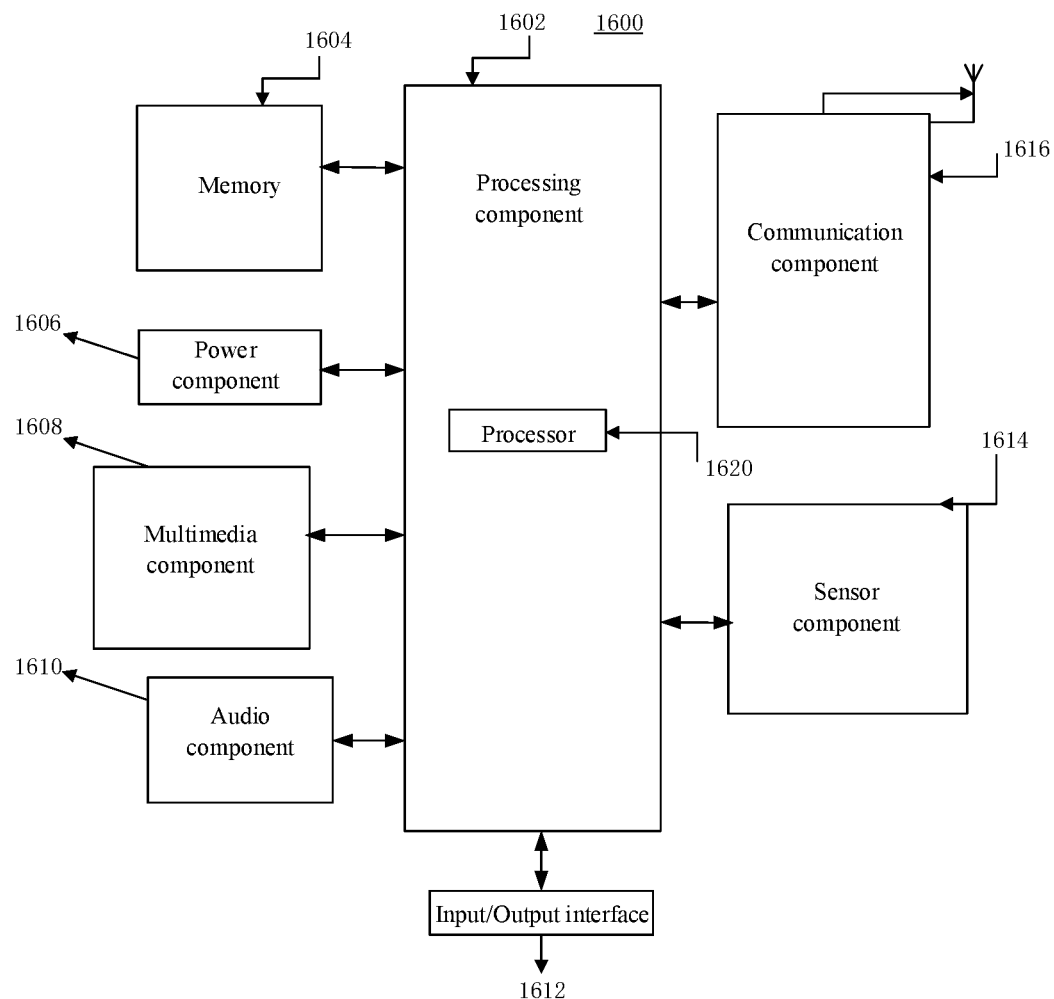
FIG. 16 is a block diagram of a data transmission device according to an exemplary embodiment.

FIG. 16 is a block diagram of a data transmission device according to an exemplary embodiment. The data transmission device 1600 is applicable to a transmitting device. The data transmission device 1600 may include one or more of the following components: a processing component 1602, memory 1604, a power component 1606, a multimedia component 1608, an audio component 1610, an input/output (I/O) interface 1612, a sensor component 1614, and a communication component 1616.

The processing component 1602 typically controls overall operations of the data transmission device 1600, such as the operations associated with display, telephone calls, data communications, camera operations, and recording operations. The processing component 1602 may include one or more processors 1620 to execute instructions to perform all or part of the steps of the methods described above. In addition, the processing component 1602 may include one or more modules which facilitate interaction between the processing component 1602 and other components. For example, the processing component 1602 may include a multimedia module to facilitate the interaction between multimedia component 1608 and the processing component 1602.

The memory 1604 is configured to store various types of data to support operation at data transmission device 1600. Examples of such data include instructions for any applications or methods operated on the data transmission device 1600, contact data, phonebook data, messages, pictures, video, etc. The memory 1604 may be implemented using any type of volatile or non-volatile memory device, or a combination thereof, such as a Static Random an Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or optical disk.

The power component 1606 provides power to various components of the data transmission device 1600. Power supply component 1606 may include a power management system, one or more power sources, and any other components associated with the generation, management, and distribution of power in the data transmission device 1600.

The multimedia component 1608 includes a screen providing an output interface between the data transmission device 1600 and the user. In some embodiments, the screen may include a Liquid Crystal Display (LCD) and a Touch Panel (TP). If the screen includes the touch panel, the screen may be implemented as a touch screen to receive input signals from a user. The touch panel includes one or more touch sensors to sense touches, swipes, and gestures on the touch panel. The touch sensor may not only sense the boundary of the touch or swipe action, but also sense a period of time and a pressure associated with the touch or swipe operation. In some embodiments, the multimedia component 1608 includes a front camera and/or a rear camera. The front camera and the rear camera may receive an external multimedia datum while the data transmission device 1600 is in an operation mode, such as a photographing mode or a video mode. Each of the front camera and the rear camera may be a fixed optical lens system or have focus and optical zoom capability.

The audio component 1610 is configured to output and/or input audio signals. For example, the audio component 1610 includes a microphone (MIC) configured to receive an external audio signal when the data transmission device 1600 is in an operation mode, such as a call mode, a recording mode, and a voice recognition mode. The received audio signal may be further stored in the memory 1604 or transmitted via communication component 1616. In some embodiments, audio component 1610 further includes a speaker for outputting audio signals.

The I/O interface 1612 provides an interface between the processing component 1602 and a peripheral interface module, such as a keyboard, a click wheel, buttons, or the like. The buttons may include, but are not limited to, a home button, a volume button, a starting button, and a locking button.

The sensor component 1614 includes one or more sensors for providing status assessment of various aspects of the data transmission device 1600. For example, the sensor component 1614 may detect the open/closed status of the data transmission device 1600, relative positioning of components, such as the display and the keypad, of the data transmission device 1600, a change in the position of the data transmission device 1600 or a component of the data transmission device 1600, a presence or absence of user contact with the data transmission device 1600, an orientation or an acceleration/deceleration of the data transmission device 1600, and a change in the temperature of the data transmission device 1600. The sensor component 1614 may include a proximity sensor configured to detect the presence of nearby objects without any physical contact. The sensor component 1614 may also include a light sensor, such as a CMOS or CCD image sensor, for use in imaging applications. In some embodiments, the sensor component 1614 may also include an acceleration sensor, a gyroscope sensor, a magnetic sensor, a pressure sensor, or a temperature sensor.

The communication component 1616 is configured to facilitate communication, wired or wireless, between data transmission device 1600 and other devices. The data transmission device 1600 may access a wireless network based on a communication standard, such as Wi-Fi, 2G, 3G, 4G, 5G, or a combination thereof, or an intercom network. In one exemplary embodiment, the communication component 1616 receives broadcast signals or broadcast related information from an external broadcast management system via a broadcast channel. In one exemplary embodiment, communication component 1616 also includes a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth (BT) technology, and other technologies.

In exemplary embodiments, the data transmission device 1600 may be implemented with one or more Application Specific Integrated Circuits (ASICs), Digital Signal Processors (DSPs), Digital Signal Processing Devices (DSPD), Programmable Logic Devices (PLDs), Field Programmable Gate Arrays (FPGAs), controllers, microcontrollers, microprocessors, or other electronic components, for performing the methods described above.

In exemplary embodiments, there is also provided a non-transitory computer-readable storage medium including instructions, such as the memory 1604 including instructions. The instructions are executable by the processor 1620 in the device 1600, for performing the above-described methods. For example, the non-transitory computer-readable storage medium may be a ROM, a CD-ROM, a magnetic tape, a floppy disc, an optical data storage device, and the like.

Figure 17:
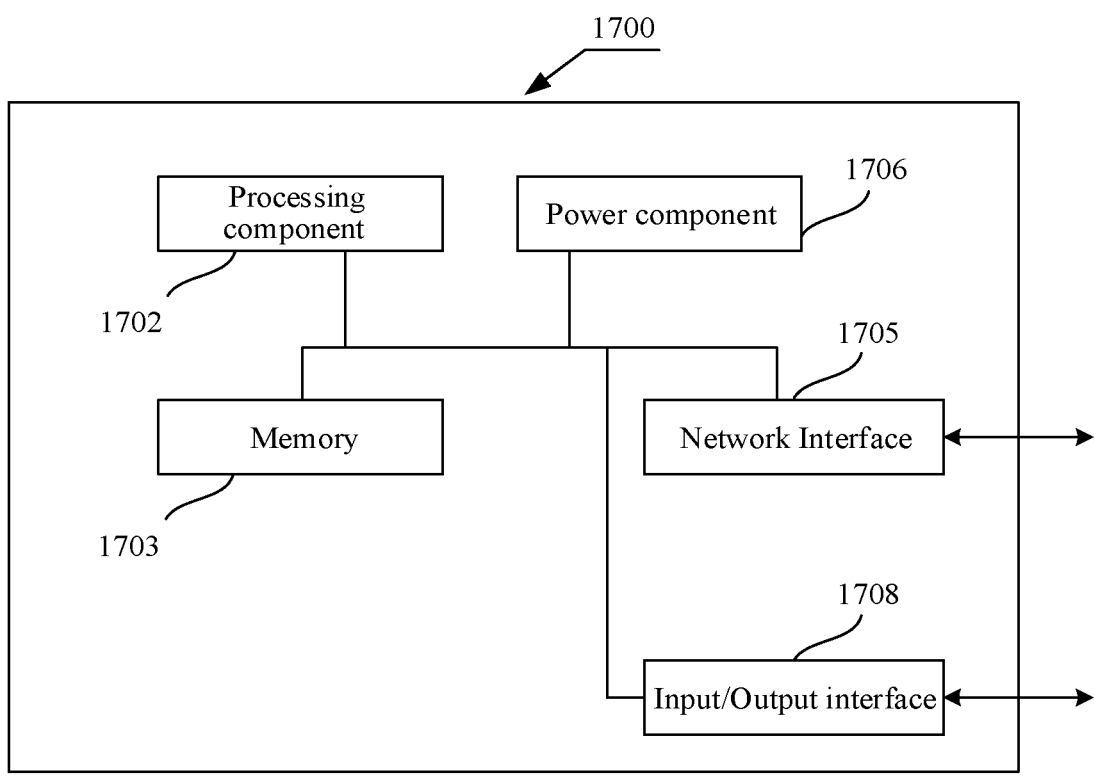
FIG. 17 is a block diagram of a data transmission device according to an exemplary embodiment.

FIG. 17 is a block diagram of a data transmission device according to an exemplary embodiment. For example, the data transmission device 1700 may be a server. The data transmission device 1700 includes a processing component 1702, which further includes one or more processors, and memory resources represented by the memory 1703 for storing instructions, such as applications, that may be executed by the processing component 1702. The application stored in the memory 1703 may include one or more modules each corresponding to a set of instructions. Moreover, the processing component 1702 is configured to execute the instructions to perform the methods described above.

The data transmission device 1700 may also include a power supply component 1706 configured to perform power management of the data transmission device 1700, a wired or wireless network interface 1705 configured to connect the data transmission device 1700 to a network, and an input/output (I/O) interface 1708. The data transmission device 1700 may operate an operating system stored in the memory 1703, such as Windows Server™, Mac OS X™, Unix™, Linux™, FreeBSD™, or the like.

A non-temporary computer-readable storage medium, for example, may be a ROM, a Random Access Memory (RAM), a CD-ROM, a magnetic tape, a floppy disk, an optical data storage device, or the like. When the instructions in the storage medium are executed by a processor of the data transmission device 1600 or the data transmission device 1700, the data transmission device 1600 or the data transmission device 1700 is caused to perform a method including:

when performing resource mapping of data to be transmitted on a first symbol of a wireless transmission resource which is allocated to the transmitting device, selecting, according to a serial number interval acquired in advance, target subcarriers at an equal interval in a frequency domain of the wireless transmission resource;

mapping the data to be transmitted to each of the target subcarriers in a frequency domain;

modulating each of the target subcarriers by using the data to be transmitted to obtain a time domain symbol;

setting information in a forwardmost part of the time domain symbol to 0 to obtain an output symbol, the forwardmost part having a preset length, wherein the preset length is equal to y/x, y is less than x, and x is the serial number interval; and transmitting the output symbol.

In an embodiment, the method further includes:

receiving a first control signaling transmitted by a network device, and parsing the first control signaling to acquire the serial number interval and preset length that correspond to the transmitting device; or receiving a second control signaling transmitted by a cluster head device in a cluster in which the transmitting device is located, and parsing the second control signaling to acquire the serial number interval and preset length that correspond to the transmitting device; or determining, according to a processing capability of the transmitting device, the serial number interval and preset length that correspond to the transmitting device.

In an embodiment, the method further includes:

transmitting a third control signaling to a receiving device, wherein the third control signaling comprises the serial number interval and preset length that correspond to the transmitting device.

In an embodiment, the serial number interval includes 2, 4 or 6.

Other embodiments of the disclosure will be apparent to those skilled in the art from consideration of the specification and practice of the disclosure here. This application is intended to cover any variations, uses or adaptations of the present invention following the general principles thereof and including such departures from the present disclosure as come within known or customary practice in the art. It is intended that the specification and examples be regarded as exemplary only, with a true scope and spirit of the invention being indicated by the following claims.

It is to be understood that the invention is not limited to the exact construction that has been described above and illustrated in the accompanying drawings, and that various modifications and changes may be made without departing from the scope thereof. It is intended that the scope of the invention only be limited only by the appended claims.

The invention claimed is:

1. A method for data transmission, applied to a transmitting device, comprising:

when performing resource mapping of data to be transmitted on a first symbol of a wireless transmission resource which is allocated to the transmitting device, selecting, according to a serial number interval acquired in advance, target subcarriers at an equal interval in a frequency domain of the wireless transmission resource;

mapping the data to be transmitted to each of the target subcarriers in a frequency domain;

modulating each of the target subcarriers by using the data to be transmitted to obtain a time domain symbol;

setting information in a forwardmost part of the time domain symbol to 0 to obtain an output symbol, the forwardmost part having a preset length, wherein the preset length is equal to y/x, y is a positive integer less than x, and x is the serial number interval; and transmitting the output symbol.

2. The method of claim 1, further comprising:

receiving a first control signaling transmitted by a network device, and parsing the first control signaling to acquire the serial number interval and preset length that correspond to the transmitting device; or receiving a second control signaling transmitted by a cluster head device in a cluster in which the transmitting device is located, and parsing the second control signaling to acquire the serial number interval and preset length that correspond to the transmitting device; or determining, according to a processing capability of the transmitting device, the serial number interval and preset length that correspond to the transmitting device.

3. The method of claim 1, further comprising:

transmitting a third control signaling to a receiving device, wherein the third control signaling comprises the serial number interval and preset length that correspond to the transmitting device.

4. The method of claim 1, wherein the serial number interval comprises 2, 4 or 6.

5. A method for data transmission, applied to a receiving device, comprising:
acquiring a serial number interval and preset length that correspond to a transmitting device, wherein the preset length is equal to y/x, y is a positive integer less than x, and x is the serial number interval;
in response to that an output symbol transmitted by the transmitting device is received, determining data to be transmitted according to the serial number interval and information of the output symbol other than information in a forwardmost part of the output symbol, the forwardmost part having the preset length.

6. The method of claim 5, wherein acquiring the preset length which corresponds to the transmitting device comprises:
receiving a third control signaling transmitted by the transmitting device, and parsing the third control signaling to acquire the serial number interval and preset length that correspond to the transmitting device; or
receiving a fourth control signaling transmitted by a network device, and parsing the fourth control signaling to acquire the serial number interval and preset length that correspond to the transmitting device; or
receiving a fifth control signaling transmitted by a cluster head device in a cluster in which the transmitting device is located, and parsing the fifth control signaling to acquire the serial number interval and preset length that correspond to the transmitting device.

7. The method of claim 5, wherein the serial number interval comprises 2, 4 or 6.

8. A device for data transmission, comprising:
a processor;
memory for storing instructions executable by the processor;
wherein the processor is configured to:
when performing resource mapping of data to be transmitted on a first symbol of a wireless transmission resource which is allocated to the transmitting device, select, according to a serial number interval acquired in advance, target subcarriers at an equal interval in a frequency domain of the wireless transmission resource;
map the data to be transmitted to each of the target subcarriers in a frequency domain;
modulate each of the target subcarriers by using the data to be transmitted to obtain a time domain symbol;
set information in a forwardmost part of the time domain symbol to 0 to obtain an output symbol, the forwardmost part having a preset length, wherein the preset length is equal to y/x, y is a positive integer less than x, and x is the serial number interval; and
transmit the output symbol.

9. The device of claim 8, wherein the processor is further configured to:
receive a first control signaling transmitted by a network device, and parse the first control signaling to acquire the serial number interval and preset length that correspond to the transmitting device; or
receive a second control signaling transmitted by a cluster head device in a cluster in which the transmitting device is located, and parse the second control signaling to acquire the serial number interval and preset length that correspond to the transmitting device; or determine, according to a processing capability of the transmitting device, the serial number interval and preset length that correspond to the transmitting device.

10. The device of claim 8, wherein the processor is further configured to:
transmit a third control signaling to a receiving device, wherein the third control signaling comprises the serial number interval and preset length that correspond to the transmitting device.

11. The device according to claim 8, wherein the serial number interval comprises 2, 4 or 6.

12. A data receiving device implementing the method of claim 5, comprising:
a processor;
memory for storing instructions executable by the processor;
wherein the processor is configured to implement operations of the method upon execution of the instructions.

13. The device of claim 12, wherein
the operations of the method further comprise: receiving a third control signaling transmitted by the transmitting device, and parsing the third control signaling to acquire the serial number interval and preset length that correspond to the transmitting device; or
the operations of the method further comprise: receiving a fourth control signaling transmitted by a network device, and parsing the fourth control signaling to acquire the serial number interval and preset length that correspond to the transmitting device; or
the operations of the method further comprise: receiving a fifth control signaling transmitted by a cluster head device in a cluster in which the transmitting device is located, and parsing the fifth control signaling to acquire the serial number interval and preset length that correspond to the transmitting device.

14. The device of claim 12, wherein the serial number interval comprises 2, 4 or 6.

15. A non-transitory computer readable storage medium, having stored thereon computer instructions that, when executed by a processor, cause the processor to implement steps of the method of claim 1.

16. A non-transitory computer readable storage medium, having stored thereon computer instructions that, when executed by a processor, cause the processor to implement steps of the method of claim 5.

17. The non-transitory computer readable storage medium of claim 15, wherein the steps of the method further comprise:
receiving a first control signaling transmitted by a network device, and parsing the first control signaling to acquire the serial number interval and preset length that correspond to the transmitting device; or
receiving a second control signaling transmitted by a cluster head device in a cluster in which the transmitting device is located, and parsing the second control signaling to acquire the serial number interval and preset length that correspond to the transmitting device; or
determining, according to a processing capability of the transmitting device, the serial number interval and preset length that correspond to the transmitting device.

18. The non-transitory computer readable storage medium of claim 15, wherein the steps of the method further comprise:
transmitting a third control signaling to a receiving device, wherein the third control signaling comprises the serial number interval and preset length that correspond to the transmitting device.

19. The non-transitory computer readable storage medium of claim 16, wherein said acquiring the preset length which corresponds to the transmitting device comprises:
receiving a third control signaling transmitted by the transmitting device, and parsing the third control signaling to acquire the serial number interval and preset length that correspond to the transmitting device; or
receiving a fourth control signaling transmitted by a network device, and parsing the fourth control signaling to acquire the serial number interval and preset length that correspond to the transmitting device; or
receiving a fifth control signaling transmitted by a cluster head device in a cluster in which the transmitting device is located, and parsing the fifth control signaling to acquire the serial number interval and preset length that correspond to the transmitting device.

20. A communication system implementing the method of claim 1, comprising:
the transmitting device, wherein the transmitting device is configured to realize a guard period (GP) function based on said mapping and said setting, to thereby enable the data to be normally transmitted at a last symbol of each sub-frame, and improve decoding performance; and
a data receiving device configured to:
acquire the serial number interval and the preset length that correspond to the transmitting device;
in response to that the output symbol transmitted by the transmitting device is received, determine data to be transmitted according to the serial number interval and information of the output symbol other than information in a forwardmost part of the output symbol, the forwardmost part having the preset length.

* * * * *